3,245,964
CONTINUOUS EXTRACTION OF POLY-E-CAPROAMIDE
Albert H. Wiesner, Chester, Fred W. Le Noir, Hopewell, and Basil G. Apostle, Richmond, Va., assignors to Allied Chemical Corporation, New York, N.Y., a corporation of New York
No Drawing. Filed Nov. 13, 1962, Ser. No. 237,377
3 Claims. (Cl. 260—78)

This invention relates to a process for the extraction of poly-ε-caproamide and more particularly to a continuous process for removing monomer and low molecular weight hot water-soluble ingredients, e.g. cyclic polymers from poly-ε-caproamide by treatment with hot water.

Polymers prepared by the usual polymerization methods from ε-caprolactam contain, as recovered from the polymerization, a certain amount of unchanged monomer, aminocaproic acid, and low molecular weight oily, hot water-soluble "oligomers" (chiefly cyclic dimer and trimer), homogeneously incorporated within the polymerization product. The presence of such low molecular weight materials is undesirable insofar as it causes difficulties arising from stickiness, weakness, etc. in operations for filament and film fabrication, extrusion and injection molding, etc.

In order to remove these low molecular weight materials from poly-ε-caproamide, it has been the practice to leach the polymer in hot water, during which proces the extractable material slowly diffuses out of the polymer and into the aqueous medium. Ordinarily, repeated leaching cycles are required, and this generally involves more than 20 hours of batch-wise polymer treatment. Such treatment is time consuming and frequently leads to variations among the batches obtained. Moreover upon prolonged exposure of the polymer to hot water, there is a tendency for a yellow coloration or even a deterioration of the polycaproamide to occur which not only affects adversely the appearance of the polycaproamide but also affects adversely the mechanical properties of objects produced therefrom.

Continuous extraction of polymer, although permitting relatively short exposure of the polymer to the extraction medium, presents difficulties in that the products often do not show a uniformly low level of extractables in consecutive samples and/or show coloration.

It is an object of this invention to provide a continuous method for the efficient extraction of poly-ε-caproamide.

It is another object of this invention to provide a continuous method for the efficient and uniform extraction of hot water-soluble materials remaining after polymerization in poly-ε-caproamide employing a relatively short period of contact of said polycaproamide with water at elevated temperatures.

These and other objects and advantages will become apparent hereinafter.

Our process involves continuous countercurrent contacting of a downward moving bed of poly-ε-caproamide particles with an upward moving body of water, using contact times as low as about 3–5 hours. To obtain a satisfactory rate of extraction of the water-soluble material from these particles, the particles used should provide large surface area and a small path through which the water-solubles can diffuse; accordingly the particles should have at least one dimension not above 0.25 inch. For ease of handling it is preferred that all dimensions of particles fed be no greater than 0.25 inch. The particles should not, however, be in a form such as a fine powder, thin platelets, or fine fibers since excessive fineness tends to result in coalescence of the particles, at least at temperatures above about 97° C. and under pressures as at the bottom of the bed; and/or results in fluidizing the bed thus disrupting the orderly movement of particles from top to bottom of the extraction zone and allowing particles to pass out with the overflow. Accordingly all dimensions of the particles are preferably not less than 0.05 inch.

In our process water is fed at ratio with poly-ε-caproamide feed of at least about 0.8 by weight per hour; the average temperature at the bottom of the extraction zone is maintained between about 90° C. and about 140° C.; a negative temperature gradient from bottom to top of the extraction zone is maintained and temperatures at the top thereof are maintained at least 5° C. below the average temperatures at the bottom thereof; and an atmosphere is maintained over the extraction zone consisting essentially of vapors evolved from the aqueous extraction medium and of an inert gas, said gas being at pressure of at least 5 p.s.i.; and the total pressure of said atmosphere over the extraction zone plus the hydrostatic pressure due to the body of aqueous medium in the extraction zone is at least about 5 p.s.i. greater than the vapor pressure exerted by water at the average temperature prevailing at the bottom of the extraction zone.

Preferably in our process the major proportion of the heat supplied to the bed of poly-ε-caproamide particles and to the aqueous medium in the extraction zone is supplied with the entering water, whereby the construction of the tower or the like used to provide the extraction zone is simplified since no elaborate heating means need be provided therefor. Since the incoming poly-ε-caproamide particles will usually be at temperatures lower than the desired temperature at the top of the extraction zone, heat must be supplied to these particles by heating means in the tower or by the incoming water. When most of the heat is supplied by the incoming water, the result will be to create a negative temperature gradient from bottom to top of the tower. This condition of a negative temperature gradient from bottom to top therefore represents the simplest and most economical type of operation suitable for our purpose of countercurrently extracting hot water-soluble materials from poly-ε-caproamide.

However when the temperature at the top of the extraction zone is lower than at the bottom, the vapor pressure in the atmosphere over the extraction zone will be lower than the vapor pressure which is exerted by water at the temperature of the bottom of the extraction zone. Under controlled laboratory conditions this need produce no difficulty, but under practical operating conditions considerable troubles may arise from this situation. If there is a loss of pressure at the top of the extraction zone for any reason, such as a leak, or a draft which cools the vapors in the top of the tower, the pressure exerted by the water at the bottom of the zone may be sufficient to cause bumping, i.e. violent boiling. Such bumping can lift the whole bed of polymer particles and blind the outlet pipes from the extraction zone, as well as disrupting the progressive flow of particles from top to bottom of the extraction zone.

To obtain the benefits of a decreasing temperature gradient from bottom to top of the extraction zone and at the same time avoid the risk of bumping at the bottom, we provide inert gas whereby to maintain excess pressure and preferably substantially constant pressure, over the extraction zone. The pressure of this inert gas is at least 5 p.s.i. and is sufficient so that the total pressure in the atmosphere over the extraction zone plus the hydrostatic pressure due to the body of aqueous extraction medium will exceed by at least 5 p.s.i. the vapor pressure exerted by water at the average temperature prevailing at the bottom of the extraction zone. In preferred operations the total pressure in the atmosphere over the extraction zone is in the range between about 1 atmosphere and about 3 atmospheres above the vapor pressure exerted by water at the average temperature prevailing at the bottom of the extraction zone, and the total pressure in the atmosphere over the extraction zone is no more than about 5 atmospheres above atmospheric pressure, this total pressure being maintained substantially constant by automatic regulation of the inert gas pressure. Thereby, we find, smooth, well-controlled operation is achieved.

In preferred operations we correlate the weight ratio of hourly feed of water:poly-ε-caproamide particles, with the contact time of the water and particles, whereby to assure the desired low levels of hot water-extractible material in the final products. We have found that a satisfactory correlation is obtained when the product of multiplying the contact time in hours × the weight ratio hourly feed of water:particles is in the range between about 5 and about 50.

As above stated the average temperatures employed at the bottom of the extraction zone in our process are in the range between about 90° C. and about 140° C. The higher the temperature used, the more efficiently is the extraction accomplished in a given time with a given ratio of water:particles. We find the temperature at the bottom of the extraction zone in our process should preferably be at least about 97° C.

However if the temperature is too high the particles may begin to coalesce, especially those particles which are at the bottom of the extraction zone and especially in a deep bed of 20 feet or more, under the pressure of the atmosphere thereover plus hydrostatic pressure of the body of aqueous extraction medium and pressure due to the weight of the compacted bed of particles immersed in the body of aqueous extraction medium. Moreover too high temperatures may result in discoloration of the polymer. The risk of discoloration can be reduced by shortening the time of exposure to high temperatures; and since high temperatures are especially useful when the polymer has a low remaining content of hot water-extractibles, there is advantage for this reason in using in our countercurrent extraction a relatively high temperature at the bottom of the extraction zone, a negative temperature gradient from bottom to top, and a relatively low temperature at the top. Particularly suitable temperatures, we have found, are in the range between about 97° C. and about 130° C. at the bottom of an extraction zone of about 20 feet-60 feet depth, and in the range between about 80° C. and about 100° C. at the top of said extraction zone, the temperature at the top being at least about 10° C. lower than at the bottom.

The extraction zone should of course be designed to avoid channeling and for this reason it will ordinarily have a vertical dimension of at least about 3 times the average horizontal dimension.

The entering aqueous extraction medium can contain ingredients which will aid the purification or contribute other desirable properties to the polymer. Typical ingredients include: chelating agents, neutralizing agents, hypophosphorous acid and other ingredients which improve the color and color stability of the polymer, bleaching agents, optical brighteners, coloring agents, dulling agents, flame-proofing agents, cross-linking agents, ultraviolet stabilizing agents, plasticizing agents, and other ingredients.

The time of contact of the polymer particles with the heated extraction medium is desirably kept below 20 hours in the process of this invention. Longer contact times can lead to gradual hydrolytic degradation of the polymer with consequent deterioration of polymer properties. It has been found desirable to permit a contact time of at least 3 hours in our process to effect the removal of extractible material to a low level such as about 2% by weight and below. In our preferred operations the contact time is between about 5 hours and about 15 hours.

It will be appreciated that the contact times used in our process, because of its efficiency, are very substantially less than the 20 hours or more usually employed heretofore to obtain a like level of hot water-extractibles.

The following specific examples set forth the best mode contemplated by us of carrying out the present invention, and illustrate critical features thereof. It is to be understood however that these examples are not to be considered as limitative of the scope of the invention. All parts and percentages are by weight unless otherwise specified.

EXAMPLE 1

In aqueous slurry, poly-ε-caproamide cylindrical 0.1 inch x 0.1 inch pellets, which pellets contained about 12% of hot water-extractible material, said material consisting essentially of ε-caprolactam monomer, ε-aminocaproic acid, oligomers of ε-caprolactam, especially the cyclic dimer and trimer thereof, and the like, were pumped at the rate of 3000 pounds of pellets per hour into the top of an extraction tower. The slurry was pumped in against the pressure of an inert gas of about 40 p.s.i. absolute, the total head pressure being automatically maintained constant at about 50 p.s.i. absolute by automatic regulation of the pressure of the inert gas. An overflow pipe allowed the slurry water to flow off together with water rising up the tower, the incoming pellets being deposited on the top of the bed of pellets in the extraction zone. The temperature of the incoming slurry was about 75° C. The inert gas was a $N_2$–$CO_2$ mixture.

The tower was a vertical cylindrical steel vessel having a height of 58 feet and a diameter of 5½ feet, with a uniform wall thickness of ⅝ inch. Deionized, iron-free water at a temperature of 110° C. and rate of 9900 pounds per hour was pumped into the bottom of the tower, supplying the heat for heating the slurry in the tower. The polymer pellets descended in countercurrent contact with the rising body of water, as a compact bed. They were removed at the bottom of the tower by a rotary-lock type feeder at a rate adjusted to give an 11 hour residence time within the tower, and a constant height of polymer bed of 40 feet. The wash water emerging at the top of the tower was at temperature about 90° C. and had a solute content of 2½%–3%. The total pressure on the aqueous medium at the bottom of the tower was about 55 p.s.i. above atmospheric or about 70 p.s.i. absolute, of which about 40 p.s.i. was due to inert gas, about 10 p.s.i. for vapor pressure of water at 90° C, and about 20 p.s.i. hydrostatic pressure.

The resulting polymer particles were centrifuged to remove adhering drops of water, then dried by contact with a flow of inert gas (nitrogen-carbon dioxide mixture) at 120° C. in a continuous countercurrent operation, whereby the polymer moisture content was reduced to less than 0.1% by weight. The residual material extractible by boiling water in the polymer thus purified averaged 1.5%, with not over 0.4% variation within any consecutive 100 pounds of polymer thus treated. The purified polymer had the same whiteness as the initial unpurified polymer, and had suffered no undesirable effects of any sort.

EXAMPLE 2

Employing generally similar apparatus and process steps to those described in Example 1, a series of runs was performed to study the effect of variations in several parameters involved. The conditions and results obtained are indicated in Table I. Runs *a* and *b* therein were carried out at extreme limits of preferred conditions for the process of this invention. These runs gave satisfactorily low levels of residual polymer impurities said purified polymers being of excellent quality and capable of being spun into high strength, useful filaments.

Runs *c–h* inclusive were carried out under process conditions outside our preferred ranges. The conditions used in these runs require longer contact times than are desirable, and/or produce polymer having more unextracted material than desired for easy spinning of high quality filaments, and/or produce in some measure undesirable process or product effects but these conditions nevertheless can be used in accordance with our invention when requirements of economics and/or quality are lower than maximum and will lead to useful results. The sharp falling off of results at conditions outside our specified ranges of conditions can be recognized from the trends shown by the runs of Table I.

*Table I*

| Run | Water:particle ratio | Average particle contact time in column (hrs.) | Weight ratio × contact time | Water temperature at inlet, °C. | Extractible content of exiting polymer, percent | Observations |
|---|---|---|---|---|---|---|
| a | 3.3 | 11.0 | 36.3 | 97.2 | 1.45 | |
| b | 1.5 | 5.2 | 7.8 | 129.6 | 1.25 | |
| c | 4.0 | 19.5 | 78.0 | 90.5 | 1.55 | |
| d | 4.5 | 4.8 | 21.6 | 95.1 | 2.38 | |
| e | 0.8 | 5.4 | 4.3 | 95.6 | 2.43 | |
|  | 3.7 | 16.6 | 61.4 | 135.6 |  | Inter-particle coalescence. |
| g | 3.5 | 24.6 | 86.2 | 125.4 |  | Particle yellowing. |
| h | 3.2 | 12.0 | 38.4 | 89.2 | 2.64 | |

EXAMPLE 3

In a study of the effect of variation in particle size and shape in the proces of this invention, apparatus and process steps generally similar to those of Example 1 were employed with the exception that the temperature of the aqueous medium at the bottom of the extraction zone was maintained at 128° C., and various sizes and shaped of poly-ε-caproamide particles were employed. The geometry of the particles studied, and the results obtained are set forth in Table II.

Runs "a" through "f" of Table II, inclusive, employed particles having dimensions outside the preferred ranges in accordance with this invention. These runs were less efficient than the runs under preferred conditions, and/or gave less easily handled products.

Run "g" of Table II, carried out under preferred conditions in accordance with this invention, satisfactorily produced purified poly-ε-caproamide of quality desired for the melt spinning of filaments. Thus, for example, poly-ε-caproamide purified in accordance with run "g" hereof can, after thorough drying as in Example 1, be melted and extruded at 255° C. through a multi-hole spinneret, quenched and drawn 5-fold at speeds greater than 250 yards per minute to yield an unbroken continuous filament yarn having a tenacity greater than 4 grams per denier. By way of comparison, poly-ε-caproamide containing as much as an average of 2% by weight of hot water-extractible material, under the same yarn fabricating conditions, shows frequent yarn breaks during fabrication and forms yarn products having unacceptably low tensile strength.

*Table II*

| Run | Poly-ε-caproamide particle dimensions | Hot water-extractible content of entering particles (weight), percent | Hot water-extractible content of exiting particles (weight), percent | Observations |
|---|---|---|---|---|
| a | Beads, .30 inch diameter. | 11.2 | 2.15 | |
| b | Rods, .27 inch long and .30 inch diameter. | 10.8 | 2.30 | |
| c | Cubes, .27 inch sides. | 12.4 | 2.20 | |
| d | Powder having average particle diameter 0.01 inch. | 7.8 |  | Bed is fluidized. |
| e | ¼ inch squares of 6 mil film. | 5.6 | 2.05 | Some coalescence of particles. |
| f | Fibrous material, ½ inch average length and 6 microns average thickness. | 4.2 |  | Coalescence of particles. |
| g | Rods, .07 inch long and .07 inch diameter. | 13.3 | 1.30 | |

The washing media which exits from the top of the column may be subjected to distillation, crystallization, extraction, or the like operations to recover therefrom organic materials, in particular ε-caprolactam monomer.

The purified polymer particles obtained by the process of this invention can be blended in large lots to minimize any slight variations in polymer characteristics such as molecular weight, extractible content, and color. The dry, blended polymer particles can be employed either alone or in admixture with other polymers and additives in various melt shaping operations such as injection molding and extrusion or spinning processes to form valuable molded objects, filaments, films, and other products. The purified poly-ε-caproamide obtained by the process of this invention is especially well suited for the production of high quality, uniform filaments e.g. fine denier filaments for textile use, heavy industrial yarns such as carpet yarn and tire yarn, etc.

It will be obvious to those skilled in the art that various changes may be made without departing from the spirit of the invention and therefore the invention is not limited to what is described in the specification and examples but only as in the appended claims.

We claim:
1. Process for extracting from poly-ε-caproamide the hot water-soluble materials remaining therein after polymerization is complete, which process comprises continuously and countercurrently contacting a downward moving bed of particles of said poly-ε-caproamide, at least one of the dimensions of said particles being not over 0.25 inch, with an upward moving body of water in weight ratio of water feed per hour:poly-ε-caproamide feed per hour of at least about 0.8, thereby forming an extraction zone containing an aqueous extraction medium; maintaining the average temperature at the bottom of the extraction zone in the range between about 90° C. and about 140° C.; supplying to said moving bed of particles the heat required to maintain said temperature range of 90° C.–140° C. by the heat content of the incoming water and thus maintaining a negative temperature gradient from bottom to top of the extraction zone and maintaining temperatures at the top thereof at least 5° C. below the average temperatures at the bottom thereof; and maintaining an atmosphere over the extraction zone consisting essentially of vapors evolved from said aqueous extraction medium and of an inert gas, said gas being at pressure of at least 5 p.s.i.; and the total pressure of said atmosphere over the extraction zone plus the hydrostatic pressure due to the aqueous extraction medium therein being at least about 5 p.s.i. greater than the vapor pressure exerted by water at the average temperature prevailing at the bottom of the extraction zone.

2. Process of claim 1 wherein the product of multiplying the contact time in hours of the poly-ε-caproamide particles times the weight ratio of hourly feed of water: poly-ε-caproamide particles is in the range between about 5 and about 50, said contact time being in the range between about 5 hours and about 15 hours; and the total pressure of the atmosphere over the extraction zone is not in excess of 5 atmospheres above atmospheric pressure.

3. Process of claim 2 wherein the temperature at the bottom of the extraction zone is in the range between about 97° C. and about 130° C.; the temperature at the top of the extraction zone is in the range between about 80° C. and about 100° C. and is at least about 10° C. lower than the temperature at the bottom; the depth of the extraction zone is in the range between about 20 ft. and about 60 ft., all dimensions of the particles of poly-ε-caproamide fed are in the range between about 0.05 inch and about 0.25 inch; and the total pressure of the atmosphere over the extraction zone is in the range between about 1 atmosphere and about 3 atmospheres above the vapor pressure exerted by water at the average temperature prevailing at the bottom of the extraction zone, and is maintained constant by automatic regulation of the inert gas pressure.

References Cited by the Examiner

UNITED STATES PATENTS

| | | | |
|---|---|---|---|
| 2,731,081 | 1/1956 | Mayner | 260—78 |
| 2,813,099 | 11/1957 | Weedman | 260—705 |
| 2,867,805 | 1/1959 | Ludewig | 260—78 |

FOREIGN PATENTS

| | | |
|---|---|---|
| 203,124 | 8/1956 | Australia. |
| 650,468 | 10/1962 | Canada. |

WILLIAM H. SHORT, *Primary Examiner.*